(12) United States Patent
Hales et al.

(10) Patent No.: US 6,256,168 B1
(45) Date of Patent: Jul. 3, 2001

(54) SHUTTER LINER FOR A DISK CARTRIDGE

(75) Inventors: Ronald F. Hales, Riverdale; Richard Tolan Brown, Roy, both of UT (US); Brian Schick, San Diego, CA (US)

(73) Assignee: Iomega Corporation, Roy, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,291

(22) Filed: Oct. 30, 1998

Related U.S. Application Data

(63) Continuation-in-part of application No. 08/968,356, filed on Nov. 12, 1997, now Pat. No. 6,005,755.

(51) Int. Cl.[7] .................................................. G11B 23/033
(52) U.S. Cl. ............................................................. 360/133
(58) Field of Search .............................. 360/133; 369/291

(56) References Cited

U.S. PATENT DOCUMENTS

| | | | |
|---|---|---|---|
| Re. 32,876 | 2/1989 | Wakabayashi et al. | 360/133 |
| 4,445,157 | 4/1984 | Takahashi | 360/133 |
| 4,471,397 * | 9/1984 | Cloutier | 360/133 |
| 4,553,175 | 11/1985 | Baumeister | 358/310 |
| 4,586,102 | 4/1986 | Bresson | 360/133 |
| 4,608,617 | 8/1986 | Oishi et al. | 360/133 |
| 4,630,728 * | 12/1986 | Matsumoto et al. | 360/133 |
| 4,644,434 | 2/1987 | Oishi et al. | 360/133 |
| 4,652,961 | 3/1987 | Dieffenbach | 360/133 |
| 4,694,448 | 9/1987 | Tamaru et al. | 369/291 |
| 4,695,911 | 9/1987 | Loosen | 360/133 |
| 4,750,075 | 6/1988 | Oishi | 360/133 |
| 4,812,938 | 3/1989 | Rogers et al. | 360/133 |
| 4,864,452 | 9/1989 | Thompson et al. | 360/133 |
| 5,006,948 | 4/1991 | Fukunaga et al. | 360/133 |
| 5,060,105 | 10/1991 | Howey | 360/133 |
| 5,083,231 | 1/1992 | Veenstra et al. | 360/133 |
| 5,216,566 | 6/1993 | Obara et al. | 360/133 |
| 5,247,416 * | 9/1993 | Shiba et al. | 360/133 |
| 5,381,402 | 1/1995 | Lee et al. | 369/291 |
| 5,469,314 | 11/1995 | Morehouse et al. | 360/105 |
| 5,481,420 | 1/1996 | Cardona et al. | 360/99.06 |
| 5,619,391 | 4/1997 | Getzoyan et al. | 360/133 |
| 5,636,095 | 6/1997 | McGrath et al. | 360/133 |
| 5,708,547 | 1/1998 | Oishi | 360/133 |
| 5,710,687 | 1/1998 | Drebenstedt | 360/133 |
| 6,005,755 * | 12/1999 | Muse et al. | 360/133 |

OTHER PUBLICATIONS

U.S. application No. 08/968,233, Hales et al., filed Nov. 12, 1997.
U.S. application No. 08/968,561, Larsen et al., filed Nov. 12, 1997.
U.S. application No. 09/096,953, Muse et al., filed Jun. 12, 1998.

* cited by examiner

*Primary Examiner*—Craig A. Renner
(74) *Attorney, Agent, or Firm*—Woodcock Washburn Kurtz Mackiewicz & Norris LLP

(57) ABSTRACT

A disk cartridge has a rotary inner shell, or shutter, to permit access to a data-storage medium disposed within the shell. A driving-access opening is located in a bottom surface of the cartridge's outer shell to allow a drive mechanism to rotate the storage medium. A portion of the inner shell projects into the driving-access opening to aid in the rotational alignment of the shell. The outer shell has a wedge-shaped disk-access opening. The inner shell rotates over a predefined arc to expose the data storage medium via the disk-access opening. A liner is disposed between the inner and outer shells to reduce sliding friction between the shells.

31 Claims, 14 Drawing Sheets

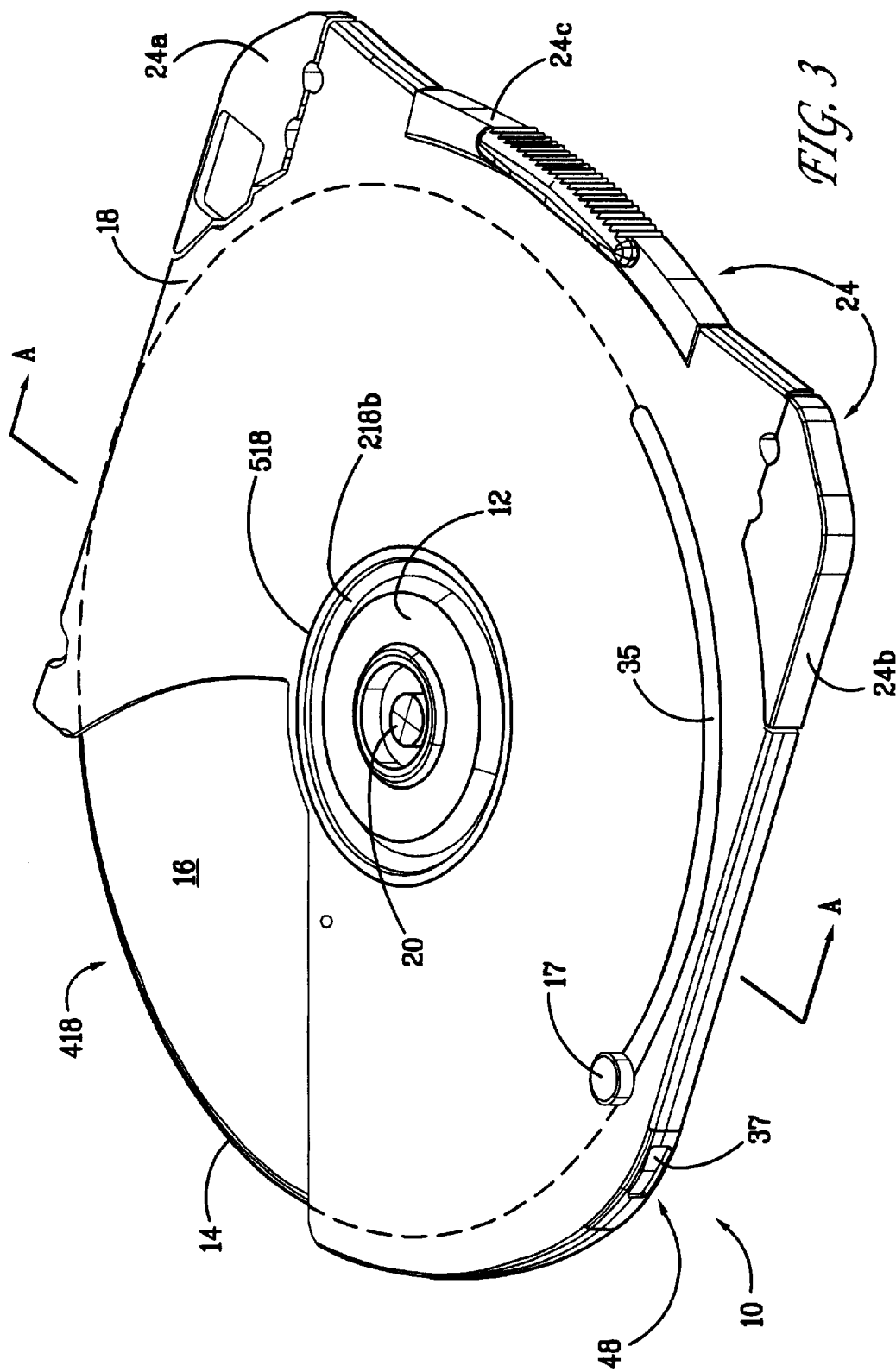

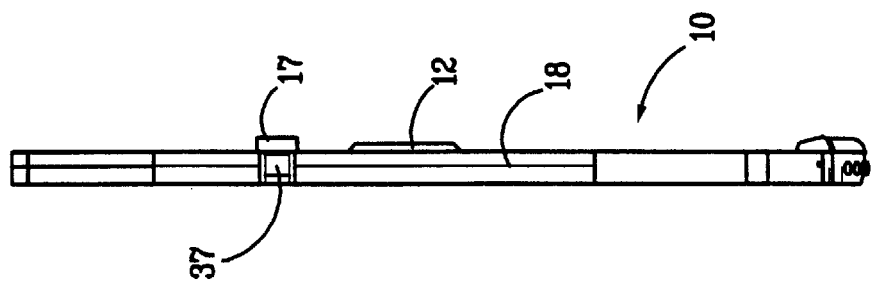
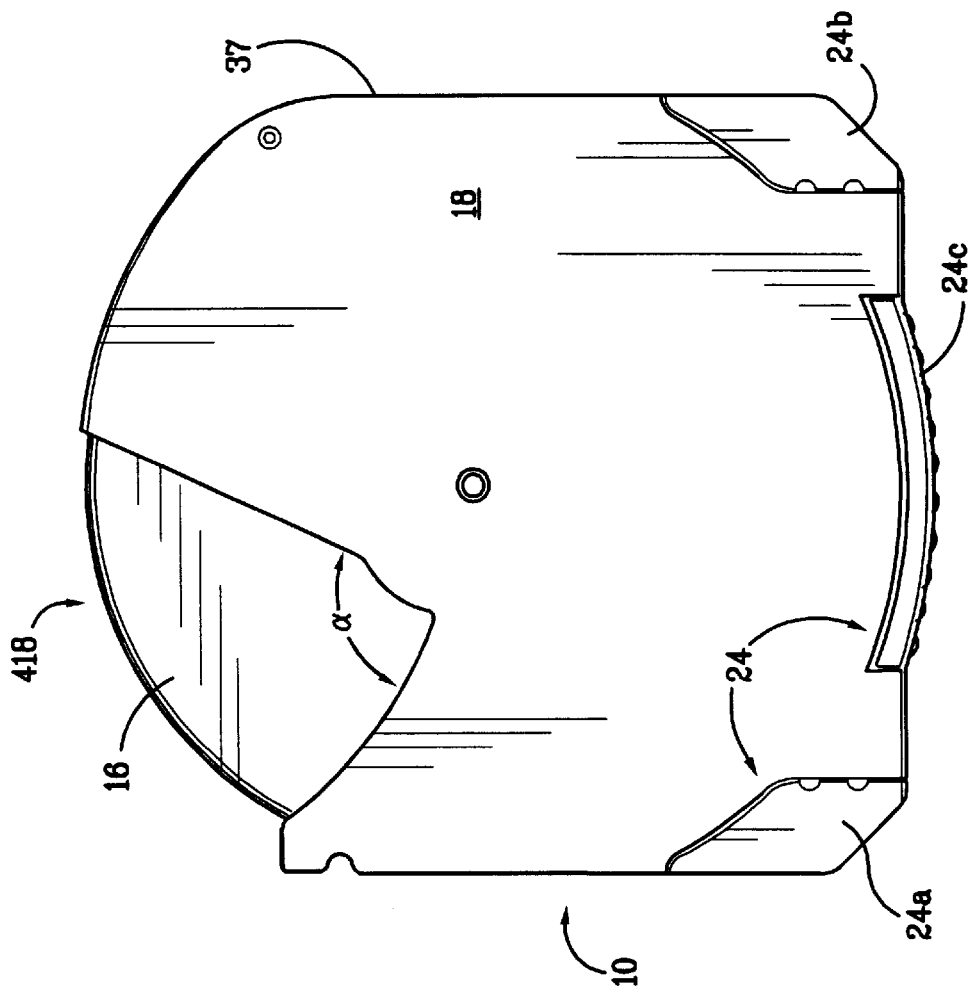

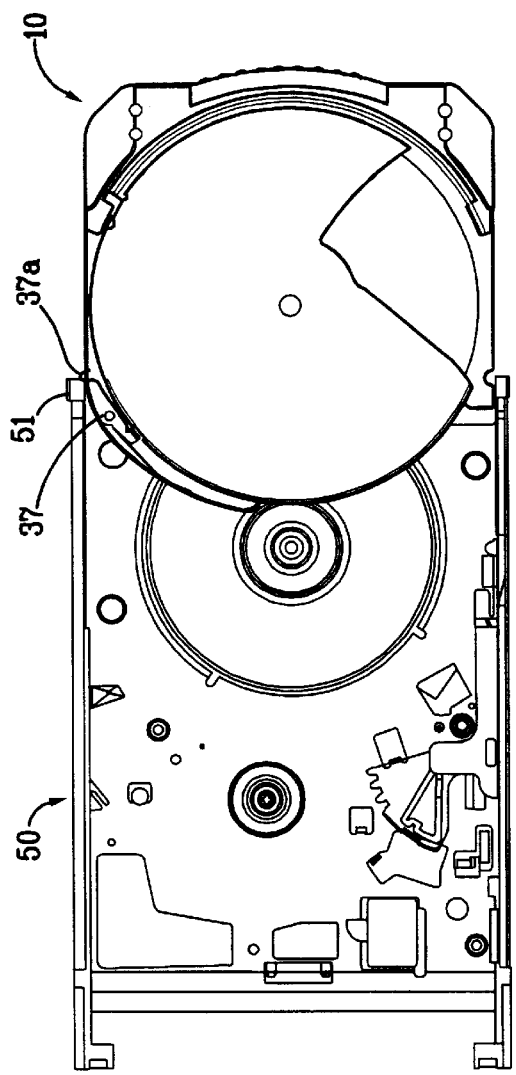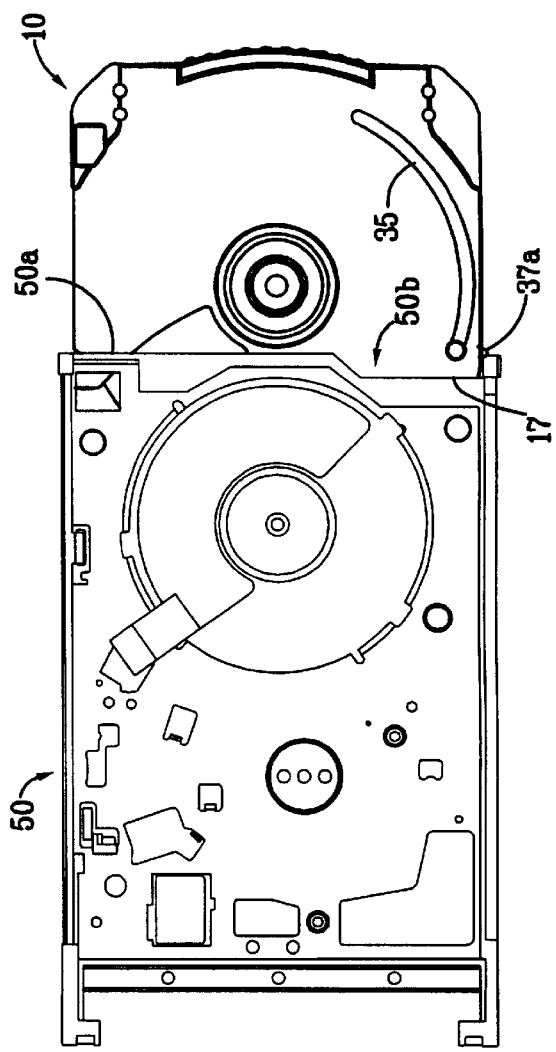

SHUTTER LINER FOR A DISK CARTRIDGE

This is a Continuation-In-Part of U.S. patent application Ser. No. 08/968,356 U.S. Pat. No. 6,005,755 entitled "Shutter Shell Encapsulating Disk Media" filed on Nov. 12, 1997, which is hereby incorporated by reference in its entirety.

BACKGROUND OF THE INVENTION

This invention relates to a cartridge-based data storage system in which a flexible magnetic disk is disposed within a cartridge shell. More particularly, the invention relates to a shutter for a disk cartridge.

Flexible-media disk cartridges with rotary shutters have been suggested for a decade or more. For example, a cartridge having a rotary shutter is disclosed in U.S. Pat. No. Re. 32,876 (Wakabayashi et al.). The Wakabayashi patent discloses a disk cassette that contains a flexible magnetic disk for storing information. The disk cassette comprises a flexible disk attached to a hub. The disk and hub assembly are sandwiched between upper and lower covers. Disk-access openings are formed in the upper and lower covers to provide access by the read/write heads of a disk drive. The Wakabayashi shutter rotates on the interior of the cartridge and comprises a metal sheet that slides over and thereby selectively covers the disk-access openings. This design represents an alternative to the more common sliding shutter found in 1.44 megabyte floppy disks, and may be preferable for a flexible-media disk cartridge in which the disk-access opening is relatively small.

A rotary shutter for a disk-access opening that is large relative to the cartridge size has more recently been disclosed. For example, U.S. Pat. No. 5,636,095 (McGrath et al.) describes a rotary shutter that covers a significant percentage of the medium within the cartridge. The McGrath cartridge comprises a hard-disk medium that is rotatably disposed within an outer shell, and a shutter that rotates within the outer shell to selectively expose and cover the medium.

Typically, the shutter and the outer shell of disk cartridges are manufactured from metal or plastic materials, and are placed in direct contact with each other. This contact maintains proper alignment between the two components while the shutter is in the open or closed positions, and while the shutter moves between these positions. Proper alignment is necessary to prevent the shutter from jamming, and to prevent the shutter and the magnetic medium from coming into contact. Such contact can lead to damage of the medium and loss of data stored on the medium.

Direct contact between the outer shell and the shutter causes wear on the contact surfaces both components. This wear eventually produces misalignment and jamming of the shutter, which can damage the magnetic medium and preclude further use of the disk cartridge. Such contact and wear also generates contaminants which can harm the disk cartridge as well as the disk drive in which the cartridge is installed.

Thus, a need exists for an improved disk cartridge in which the sliding friction between the contact surfaces of the shell and the shutter is reduced, while sufficient contact is maintained to keep the shell and the shutter in proper alignment.

SUMMARY OF THE INVENTION

The present invention is directed to a data storage device that comprises a disk drive and a removable cartridge. The cartridge comprises an outer shell having a spindle-access opening, a substantially circular medium rotatably disposed within the outer shell, and a hub connected to the magnetic medium proximate the center of the medium. The cartridge also comprises an inner shell having a spindle-access opening and a head-access opening. The spindle-access openings of the inner and outer shells are substantially aligned. The inner shell is rotatably coupled to the outer shell between a first and a second position. In the first position, the head-access openings of the inner and outer shells substantially align, while in the second position the access openings are substantially misaligned. The magnetic medium is rotatably disposed within the inner shell.

The inner shell preferably comprises upper and lower halves having raised outer edges. The two shell halves are brought together so that their edges overlap to form a single inner shell. The inner shell is substantially disc shaped and has a hollow interior wherein the disk media is rotatably disposed. The disk-access openings in the inner and outer shells are substantially wedge shaped and comprise an angle of less than about 90 degrees, and preferably about 80 degrees. The disk-access openings expose a surface area of the medium in a range of about 15 to 25 percent of the medium's total surface area; preferably, this percentage is about 22 percent. The shutter rotates over an arc of less than about 90 degrees, and preferably about 80 degrees.

Because the shutter shell is rotatably disposed within the outer shell, it rotates about a center point of the outer shell. A post projects downward from the interior of the upper outer shell and rotatably captures the upper shutter shell. The lower shutter shell has an annular projection that projects into the spindle-access opening of the outer shell to provide further rotational stability to the shutter shell.

A liner is disposed between the shutter and the outer shell. Although the liner is preferably attached to the outer shell, the liner may alternatively be attached to the shutter shell. Preferably, the liner comprises 100% polyester and has a thickness of less than about 3.5 mils.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show an embodiment that is presently preferred. The invention is not limited, however, to the specific methods and instrumentalities disclosed in the drawings. In the drawings:

FIG. 3 is a bottom isometric view of a cartridge for use with the drive of FIG. 1;

FIG. 4 is a top plan view of the cartridge of FIG. 2;

FIG. 5 is a side elevation view of the cartridge of FIG. 2;

FIGS. 10A through 10F illustrate the operation of shutter shell 16 in conjunction with the drive of FIG. 1.

DETAILED DESCRIPTION OF PREFERRED EMBODIMENT

The present invention provides a data-storage cartridge for use with a removable-media type of disk drive. Throughout this description, a preferred embodiment of the invention is described in connection with a cartridge of a particular size and shape. However, many aspects of the cartridge shape are presented for exemplary purposes only. Accordingly, the mechanism should not be limited to the particular cartridge embodiment shown, as the invention contemplates application to other types of cartridges and disk drives.

Figure 1:
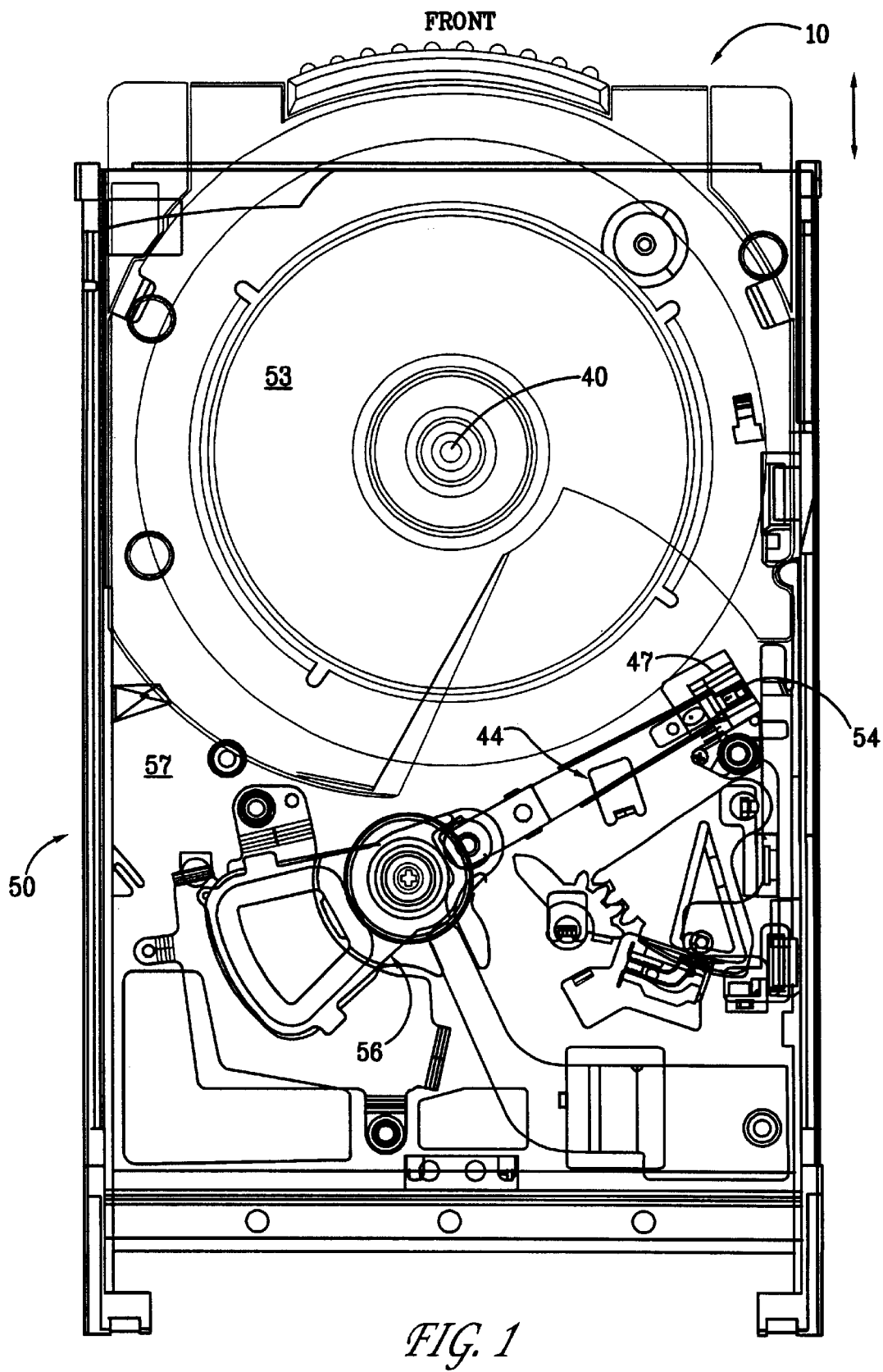
FIG. 1 is a top plan view of a disk drive according to the present invention.

FIG. 1 is a top view of a disk drive 50 with its top cover removed for clarity. Drive 50 accepts a removable data-storage cartridge 10 (shown in phantom) for reading and storing digital information. Drive 50 comprises a chassis 57; an actuator 56, including an opposing pair of load beams 44 having a read/write head 54 disposed at the end of each beam; a load ramp 47; a spindle motor 53; and a spindle 40. Data-storage cartridge 10 can be inserted into the front of the drive in the direction indicated by the arrow. During insertion, cartridge 10 slides linearly along the top surfaces of chassis 57 and spindle motor 53.

FIGS. 2 through 5 show the exterior features data-storage cartridge 10 in further detail. As shown, cartridge 10 has a somewhat angular main body 10b, an arcuate front portion 10a. Cartridge 10 comprises an outer shell 18 and an inner shell, or shutter 16. Cartridge 10 also comprises a flexible magnetic disk 14 (shown in phantom in FIG. 3) and a disk hub 12 that is attached to disk 14. Disk hub 12 and magnetic disk 14 are rotatably disposed within shell 16. Shutter shell 16 rotates within outer shell 18 to selectively expose disk 14 by way of a large, wedge-shaped disk-access opening 418 disposed in the front portion of cartridge 10, and a similarly-shaped access opening 416 incorporated into shutter 16.

A drive-access hole 218b provides an opening in cartridge 10 for a drive spindle 40 to engage hub 12 and move disk 14 over read write/head 54 (also shown in FIG. 1). Hub 12 is sized smaller than driving hole 218b and projects downwardly from cartridge 10. Cartridge 10 also comprises a projection 17 coupled to shutter shell 16. Projection 17 travels along a projection track 35 on cartridge 10, thereby opening and closing shutter shell 16. A latch mechanism 37 is accessible through a latch window 48 and keeps shutter 16 locked in a closed position when cartridge 10 is not installed in drive 50.

Figure 2:
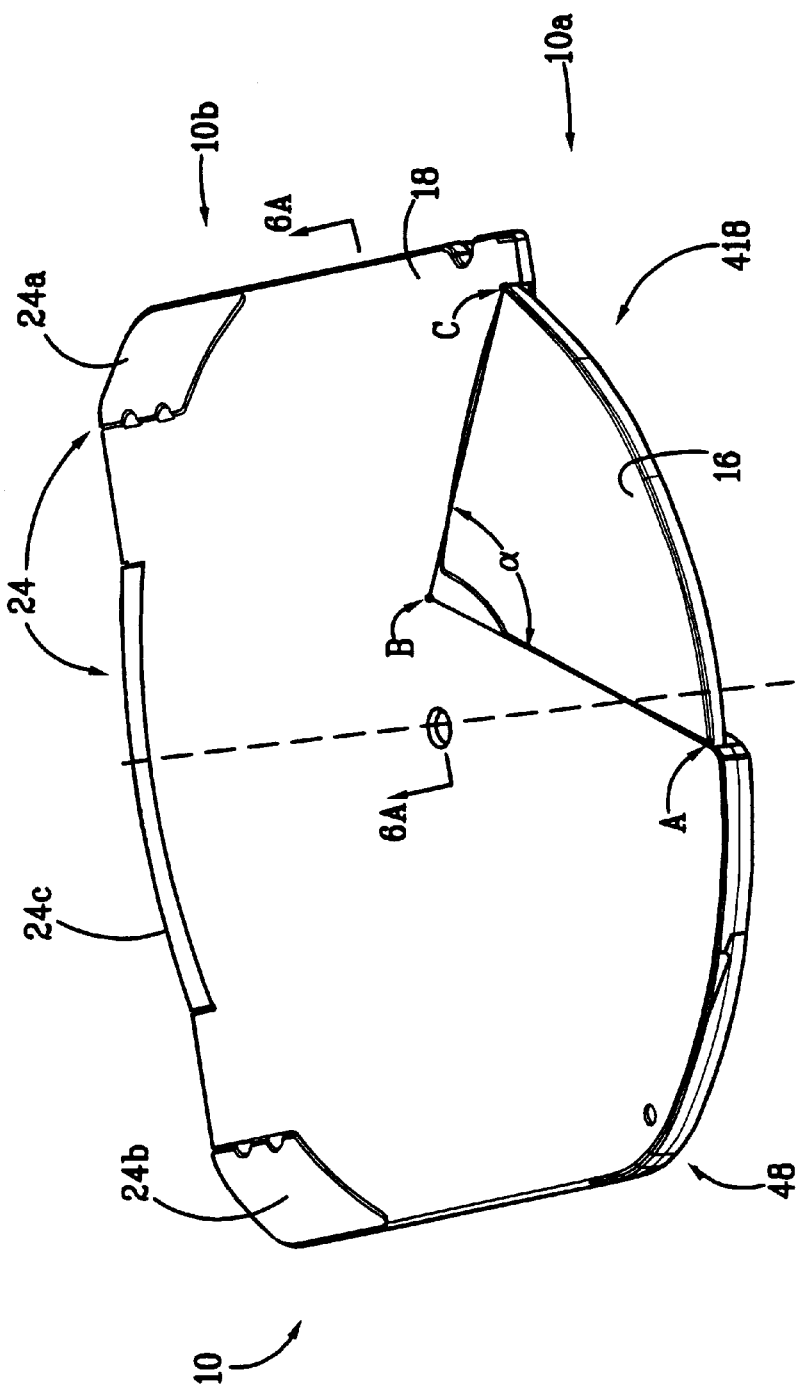
FIG. 2 is a top isometric view of a cartridge for use with the drive of FIG. 1.

As best shown in FIG. 2, disk-access opening 418 is formed in a front portion of cartridge 10 (proximately defined by the points A, B and C), proximate one corner thereof. Opening 418 extends over an arc α between the lines A–B and B–C. Arc α is preferably less than about 90 degrees, and is most preferably about 80 degrees. Accordingly, shutter shell 16 rotates within outer shell 18 starting from proximately point C to proximately point A, over an arc of about 80 degrees. Notably, point A defines a portion of the wedge-shaped opening just past bisecting line 5. Because the shutter rotates over an arc of approximately 80 degrees, about 15 to 25 percent, and preferably about 22 percent of the edge of magnetic disk 14 is exposed when the shutter is open. At the same time, approximately 15 to 25 percent of the total surface area of disk 14 is exposed. The exposure afforded by disk-access opening 418 provides read/write head 54 with sufficient access to the surface of disk 14 to enable the use of a rotary actuator design.

Figure 6:
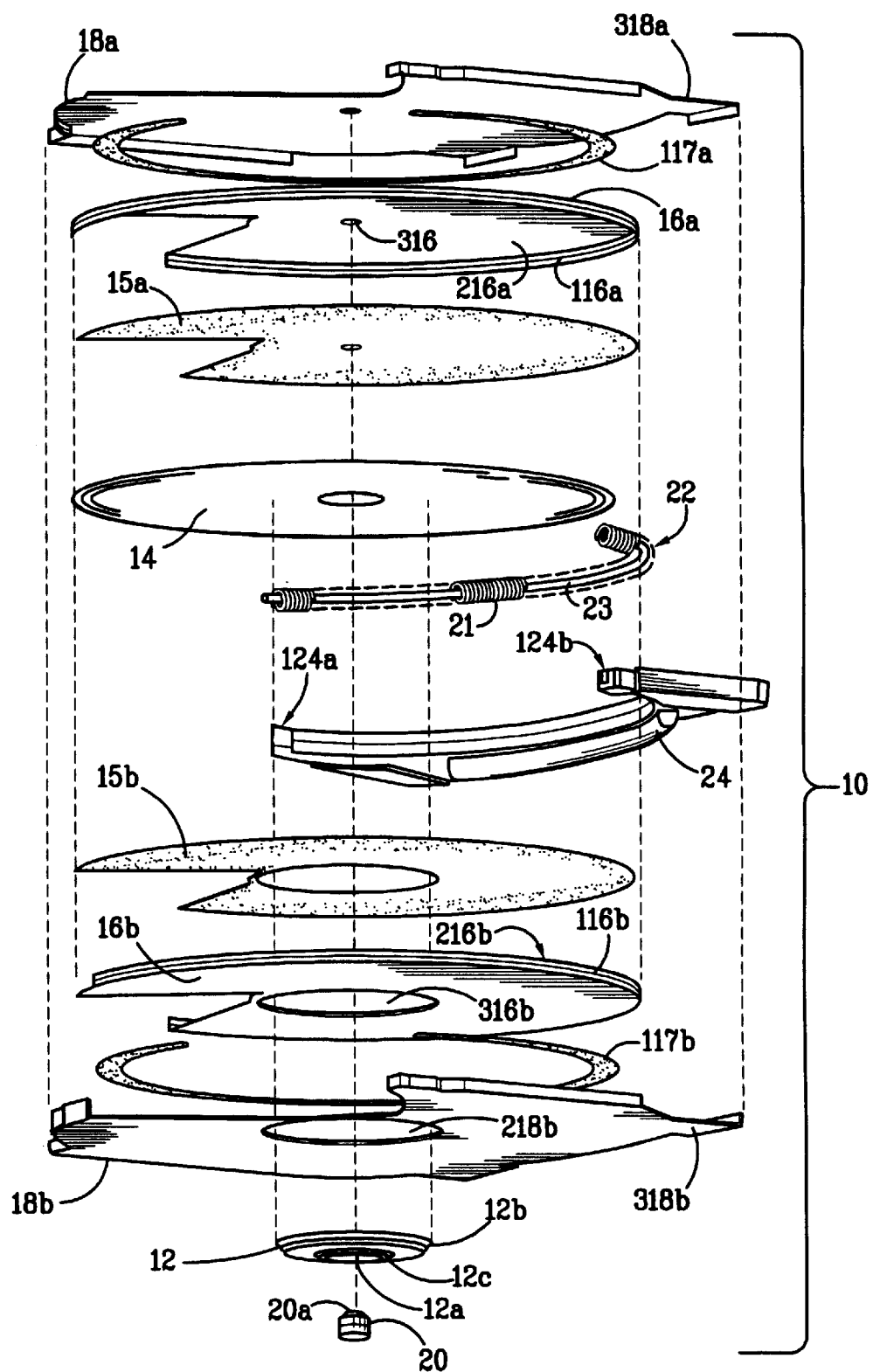
FIG. 6 is an exploded view of the cartridge of FIG. 2.

FIG. 6 is an exploded view which more clearly shows the interior components of disk cartridge 10. Cartridge 10 comprises upper and lower shell halves 18a and 18b, respectively, a rotary shutter shell having upper and lower halves 16a and 16b, respectively, upper and lower shutter-shell liners 15a and 15b, respectively, a shutter pivot post 20, a shutter spring mechanism 22, and a shell spacer 24. Projection 17 is coupled to lower shutter-shell half 16b.

As noted above, magnetic disk 14 rotates within shutter shell 16, and not directly within outer cartridge shell 18. Therefore, liners 15a and 15b are attached to the inner surfaces of shutter shell 16, rather than to the inside of the cartridge shell as in other known designs. Specifically, liner 15a is attached to an inner surface 216a of shutter shell half 16a, and liner 15b is attached to an inner surface 216b of shutter shell half 16b. Liners 15a and 15b cover surfaces 216a and 216b in their substantial entirety.

Liners 15a and 15b are preferably attached to shell 16 via an adhesive, and more preferably by a pressure-sensitive adhesive. Liners 15a and 15b are cut from a sheet of liner material into a shape conforming to that of surfaces 216a and 216b. The liner material is preferably a blend of 40 percent rayon and 60 percent polyester, and more preferably is "VERATEC 1184.2" (available from the Veratec Division of International Paper Corp., in Walpole, Mass.). Preferably, the liner has a thickness of about 3.5 mils.

Spacer 24 is substantially U-shaped and is positioned in the rear portion of cartridge 10, between upper and lower cartridge-shell halves 18a and 18b. Cartridge-shell tabs 318a and 318b extend rearwardly from upper and lower shell halves 18a and 18b, and wrap around spacer 24. Therefore, when cartridge 10 is assembled, a portion of spacer 24 D extends into and between shell halves 18a and 18b, and portions of spacer 24 protrude from joined upper and lower shell halves 18a and 18b. The protruding portions of spacer 24 form portions of the outer contours of cartridge 10. In particular, spacer 24 forms rear corners 24a and 24b, and rear portion 24c of cartridge 10.

Spacer 24 is formed from a lightweight and rigid material such as plastic; i preferably, the material is high-impact polystyrene. Spacer 24 may be manufactured by any of the well-known plastic-forming processes such as injection molding. Spacer 24 provides dimensional stability and rigidity to cartridge 10, thereby minimizing cartridge deformation during mishandling and twisting.

Shutter-spring mechanism 22 comprises a guide wire 23, and a round helical compression spring 21 that slides over guide wire 23. Spring mechanism 22 is fixed to spacer 24 at the ends of guide wire 23. The ends of guide wire 23 seat in channels 124a and 124b, which are formed into the ends of spacer 24.

Magnetic disk 14 is formed from a thin polymer film, such as MYLAR, and has a thin magnetic layer uniformly dispersed on its top and bottom surfaces. This magnetic layer makes disk 14 susceptible to magnetic flux, and enables the storage of digital data when the disk surface is brought into magnetic communication with a magnetic transducer of the type commonly found in disk drives. Disk 14 is circular, with a circular hole proximate its center. The radius of disk 14 is preferably ranges between about 20 to 25 mm, and more preferably between about 23 to 25 mm. Disk 14 has concentric tracks that facilitate formatting of the disk.

Disk hub 12 is essentially donut shaped and is formed from a ferrous material such as steel, preferably stainless steel. Hub 12 comprises a bore or hole 12a proximate a center, peripheral outer edge 12b, and an inner-ring surface 12c. Inner-ring surface 12c has an outer angled edge and a substantially flat bottom surface. Outer peripheral edge 12b is also angled. Hub 12 is firmly secured to disk 14 such that the center of the hub is aligned proximate the center the disk. Hub 12 is preferably attached to disk 14 via an adhesive material.

As noted previously, the assembly comprising disk 14 and hub 12 is rotatably disposed between upper and lower shutter-shell halves 16a and 16b. Hub 12 is disposed in a spindle-access hole 316b formed in lower shutter shell 16b. Hub 12 is also disposed in a spindle-access hole 218b formed in lower cartridge shell 18b. As described in further detail below, the protrusion of hub 12 from shutter shell 16 and cartridge shell 18 enhances coupling to a rotational power source, such as that provided by a drive spindle, when cartridge 10 placed in drive 50. The protrusion also acts a restraint on lateral movement of disk 14 when cartridge 10 is removed from drive 50.

Figure 7:
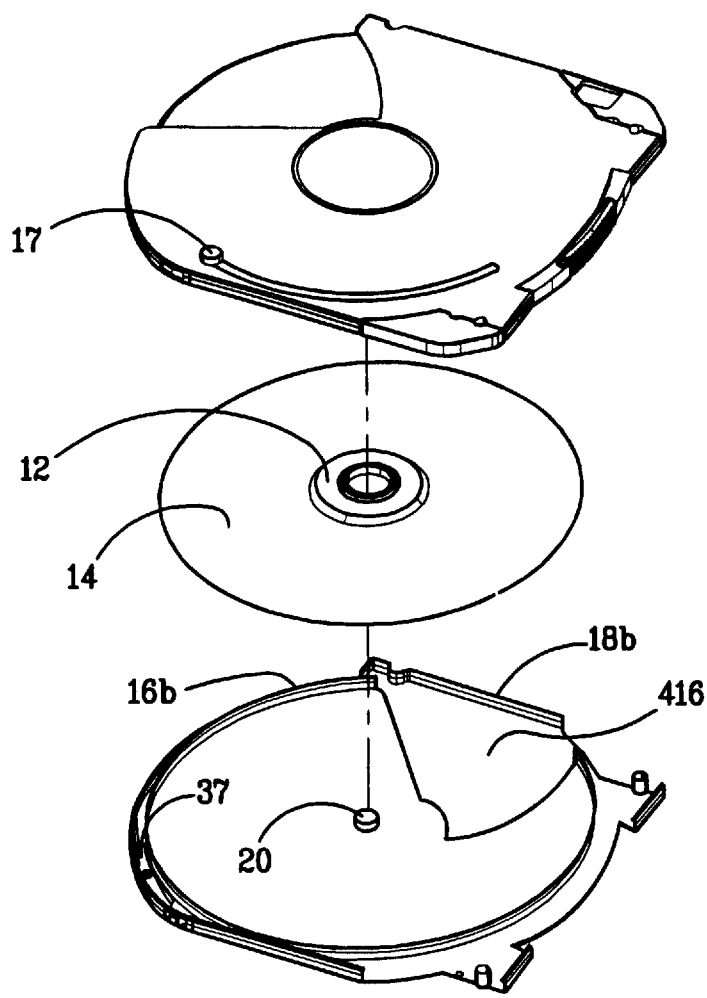
FIG. 7 is a partially exploded view of the cartridge of FIG. 2 showing a shutter latching mechanism.

As illustrated in FIGS. 6 and 7, shutter-shell halves 16a and 16b fit together such that an edge 116a of upper shell half 16a fits within an edge 116b of lower shell half 16b. Shutter assembly 16 is pivotally attached to upper cartridge shell 18a, and is pivotally disposed within lower cartridge shell 18b. Hub 12 is attached to disk 14 and protrudes through drive-access hole 316b in lower shutter shell 16b. Accordingly, when cartridge 10 is inserted and operating in drive 50, disk 14 rotates within shutter shell 16.

Shutter assembly 16 is connected to upper cartridge shell 18a via shutter pivot post 20. Pivot post 20 is fixedly attached to upper cartridge shell 18a via a pivot hole 218b. Shutter 16 is rotatably coupled to post 20 via a pivot hole 316.

Figure 7A:
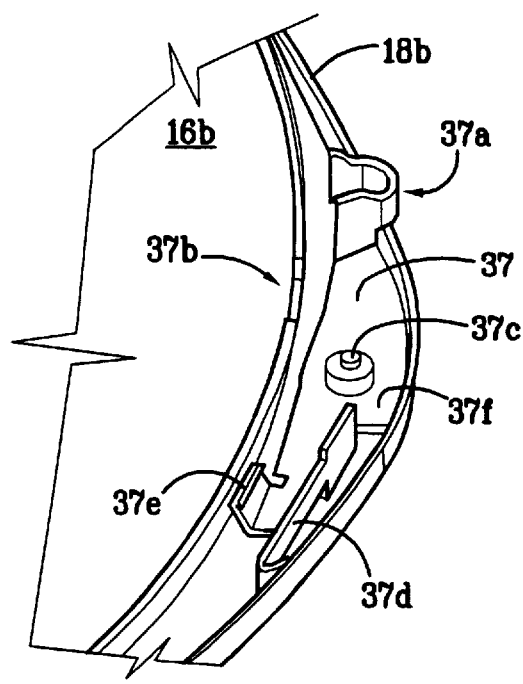
FIG. 7A is a detailed view of an embodiment of the latch of FIG. 7.
Figure 7B:
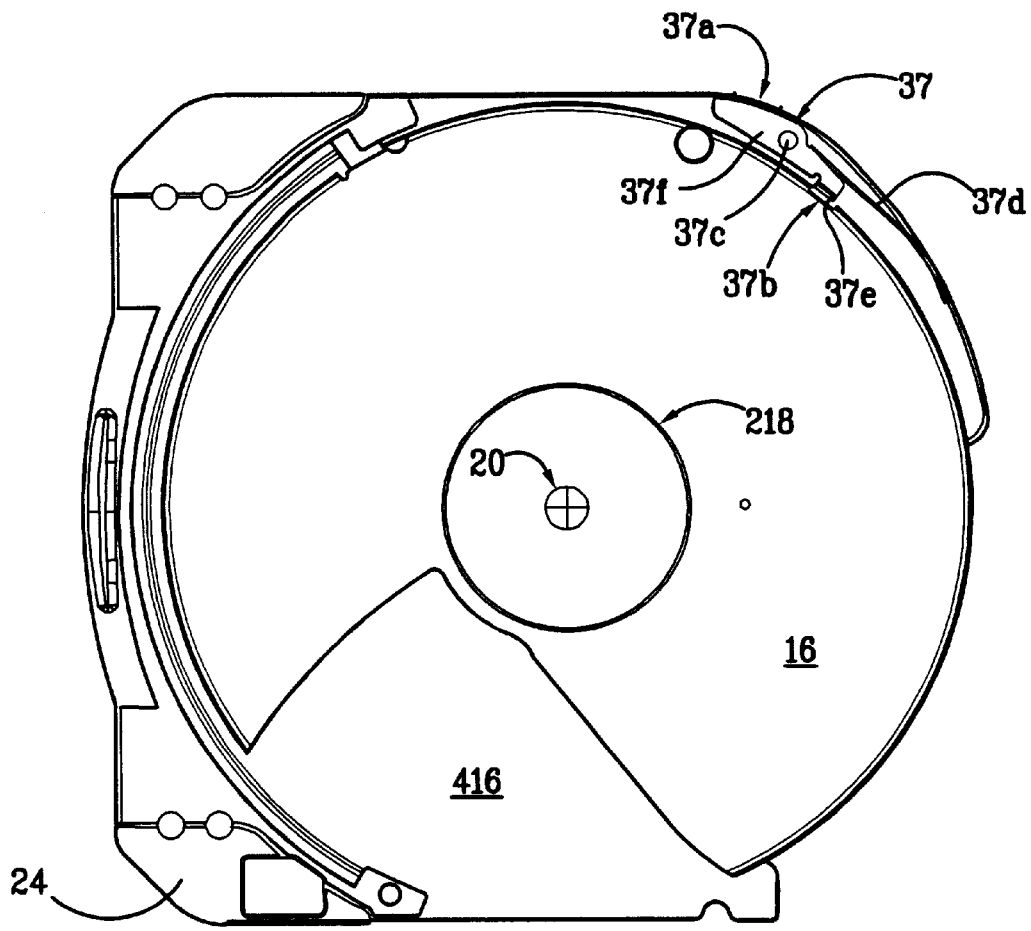
FIG. 7B is a detailed view of another embodiment of the latch of FIG. 7.

Magnetic disk 14 is exposed via a disk-access opening 416 in shutter 16 (visible in FIGS. 7 and 7B). However, disk 14 is only accessible from outside of cartridge 10 when shutter opening 416 aligns with disk-access opening 418 in cartridge shell 18. For such an alignment to occur, shutter shell 16 moves to a first position such that access openings 416 and 418 completely overlap, thereby "opening" cartridge 10. When shutter shell 16 moves to a second position such that openings 416 and 418 are misaligned, cartridge 10 is "closed" and disk 14 is shielded from the ambient environment.

Figure 6A:
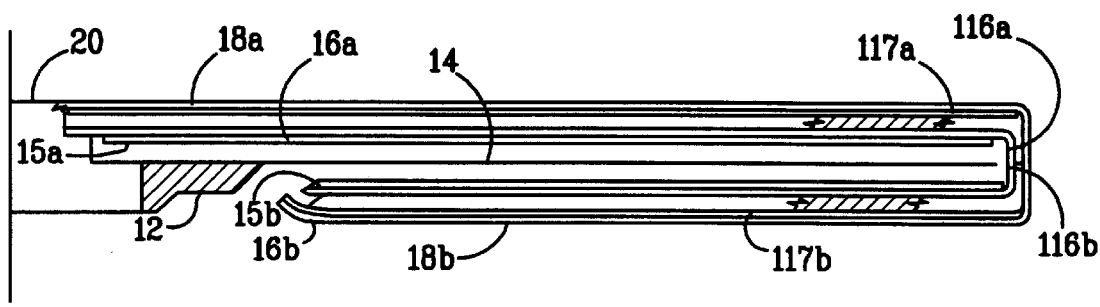
FIG. 6A is a cross section of the cartridge of FIG. 2 along the line 6A—6A.

A liner 117a is disposed between upper cartridge shell 18a and upper shutter shell 16a, as illustrated in FIGS. 6 and 6A. Similarly, a liner 117b is disposed between lower cartridge shell 18b and lower shutter shell 16b. Preferably, the liners are attached to the inner surfaces of the cartridge shells, although some advantages of the invention may also be realized by attaching the liners to the outer surfaces of the shutter shells.

Liners 117a and 117b are preferably attached via an adhesive, more preferably a pressure-sensitive adhesive. The liners are cut from a sheet of liner material into the shape of the surfaces to which they will be attached, i.e., cartridge shell 18 or shutter shell 16. The liner material is preferably 100% polyester, and more preferably is "VERATEC 141-075" (available from the Veratec Division of International Paper Corp., in Walpole, Mass.). The liner material has a thickness preferably in the range of about 1.5 to 3.5 mils; more preferably, the thickness is about 2.5 mils.

Figure 6B:
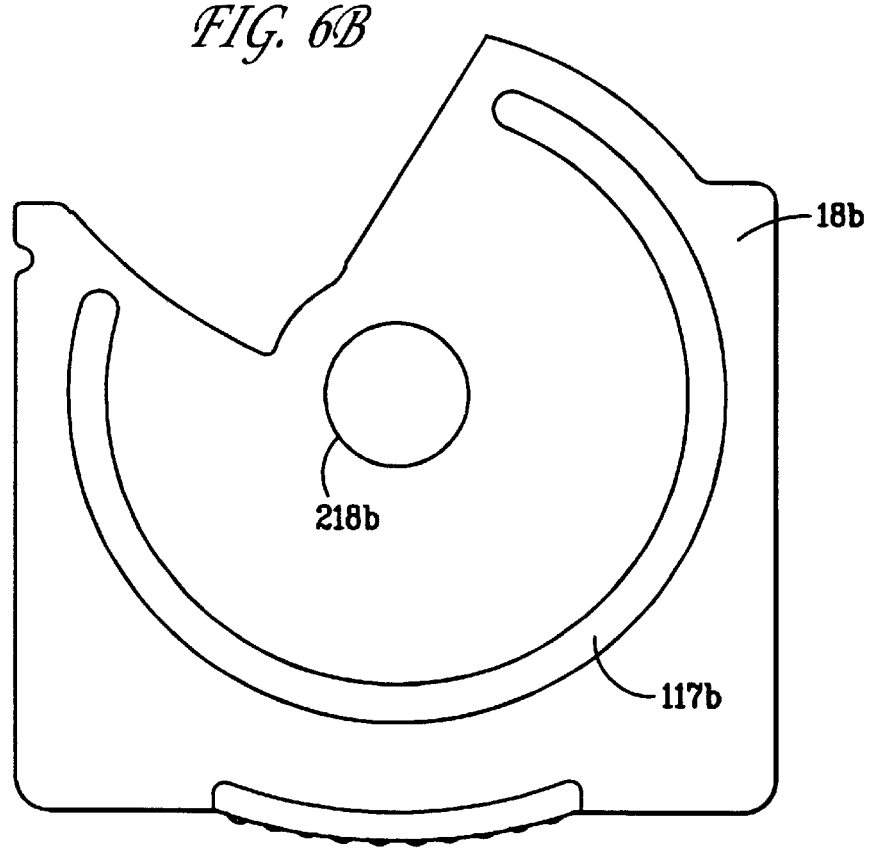
FIG. 6B is a top plan view of the cartridge of FIG. 2 with the upper cartridge shell and the upper and lower shutter shells removed to reveal the inner surface of the lower cartridge shell.

In a preferred embodiment, liners 117a and 117b are radially disposed along substantially the entire circumferential length of cartridge shells 18a and 18b or shutter shells 16a and 16b. Preferably, the circumferential width of liners 117a and 117b is between about one-fourth and one-third of the radius of shutter shell 16. In a preferred embodiment, liners 117a and 117b are disposed along the outer circumference of cartridge shells 18a and18b or shutter-shell halves 16a and 16b, as illustrated in FIGS. 6A and 6B. (For illustrative purposes, liner 117b is shown in FIG. 6B as being attached to lower cartridge shell 18b.)

Liners 117a and 117b allow positive contact to be maintained between shutter 16 and outer shell 18 while the shutter is moved between the open and closed positions, and while the shutter is "parked" in either of these position. Proper alignment of shutter 16 and outer shell 18 is thus maintained at all times, thereby preventing jamming of the shutter and damage to magnetic disk 14 caused by accidental contact with the shutter.

Liners 117a and 117b also eliminate direct contact between shutter 16 and outer shell 18. Because direct contact between the metal or plastic surfaces of shutter 16 and outer shell 18 is replaced by contact with the relatively soft liner, wear of the shutter and the shell due to sliding friction is significantly reduced. Thus, the potential for problems associated with wear-induced misalignment and jamming of shutter 16 is correspondingly reduced. Furthermore, the potential for contact-generated debris is also lessened.

In embodiments in which liners 117a and 117b are attached to outer shell 18, the liners provide a further advantage. Specifically, the liners protect magnetic disk 14 by preventing contact between the disk and outer shell 18 when shutter 16 is in the closed position. Without the liners, such contact is possible because when shutter 16 closed, i.e., when shutter disk-access opening 416 is positioned inside of outer shell 18, a portion of disk 14 is exposed to the inner surface of shell 18 via access opening 416. Contact between disk 14 and shell 18 can thus occur when cartridge 10 is inadvertently dropped or otherwise exposed to some type of shock. The presence of liners 117a and 117b on the inner surface of outer shell 18 isolates the exposed portion of disk 14 from direct contact with the outer shell. Instead, any contact occurring under such circumstances is between the disk and the liner, which is less likely to damage the disk or the information stored on the disk.

Cartridge 10 employs a projection 17 to accommodate the opening of shutter 16 during insertion of cartridge 10 into drive 50. The projection operates by impinging upon the cartridge-insertion opening of drive 50 as cartridge 10 is inserted into the drive. Because projection 17 extends beyond the general thickness of cartridge 10, projection 17 cannot fit through the relatively narrow drive opening. Accordingly, as cartridge 10 is forced into drive 50, projection 17 impinges on the frame of drive 50 and drags shutter 16 to an open position.

As noted above, projection 17 is coupled to shutter shell 16. Although projection 17 may be integrally formed in shutter 16, it is preferably attached to the shutter as a separate part, such as by welding. Preferably, projection 17 possesses a substantially circular cross-section, and is manufactured from a wear-resistant material such as metal. Projection 17 extends downward from shutter shell 16, through a projection track 35 cut into lower cartridge shell 18b.

When data storage cartridge 10 is in the "closed" position, a compression spring 21 biases shutter 16 toward in its first, or closed position, thereby moving projection 17 to its forward-most position in projection track 35 (as shown in FIG. 2). To open cartridge 10, a counterclockwise rotational force (as viewed from the perspective of FIG. 2) is applied to shutter shell 16 via projection 17, thereby moving the projection to the rear-most portion of projection track 35, compressing spring 21, and moving shutter 16 to its second, or "open" position.

Figure 8:
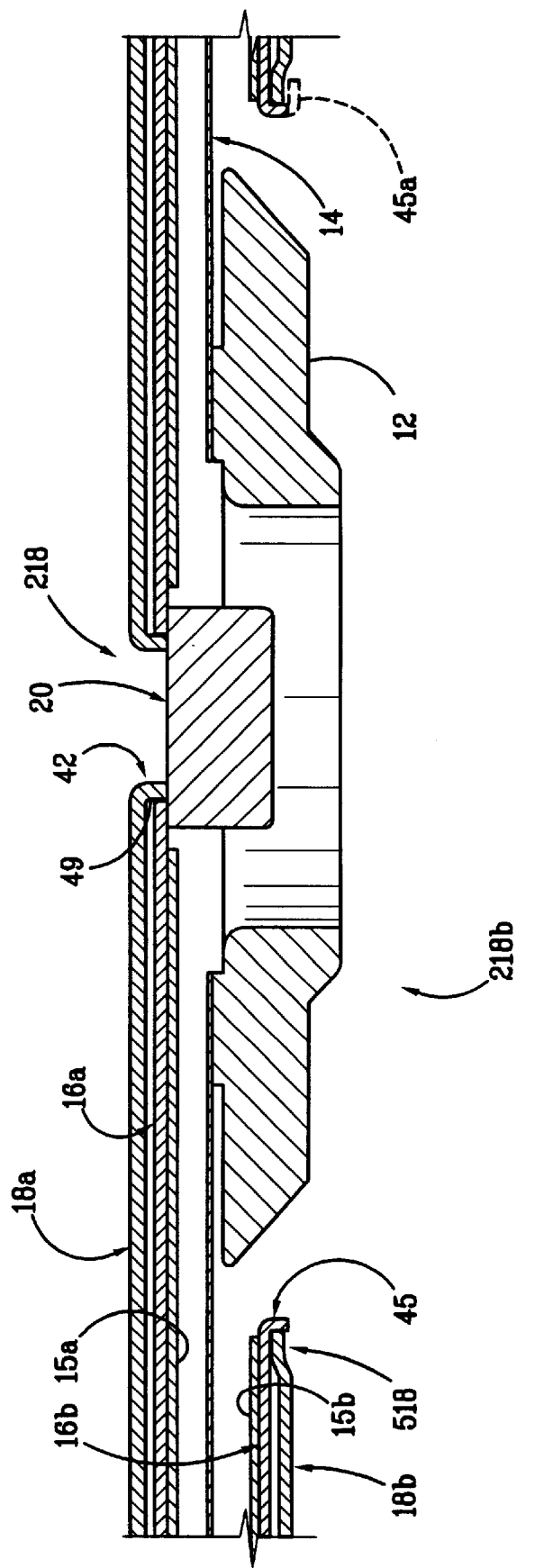
FIG. 8 shows a cross-section of the cartridge of FIG. 3 along the line A—A.

FIG. 8 is a cross-sectional view of data storage cartridge 10 along line A—A of FIG. 3. FIG. 8 also illustrates an alternative to the means shown in FIG. 6 for attaching post 20 to upper cartridge shell 18a. In the embodiment of FIG. 8, shell 18a has a raised rim 42 that extends into the interior of cartridge 10. Post 20 is attached to the distal end of rim 42, thus providing a space 49 into which upper shutter shell 16a is rotatably disposed. Space 49 also can be created by forming post 20 with a reduced-diameter section 20a and attaching section 20a directly to the interior of upper cartridge shell 18a, as shown in FIG. 6.

As noted above, lower shutter shell 16b is rotatably disposed within lower cartridge shell 18b. Rotational alignment of shutter shell 16 is further provided by a raised lip 45 on shell 16b. Lip 45 projects into spindle-access opening 218, and is radially constrained by an annular depression 518 formed in bottom shell 18b.

Other embodiments of lip 45 may be employed. For example, although lip 45 is shown in the figures as projecting straight down into spindle-access hole 218, the end of lip 45 could wrap around bottom shell 18b, as indicated by phantom portion 45a. Additionally, lip 45 is not necessarily continuous, and may be formed as a plurality of fingers projecting into opening 218b. Moreover, although lip 45 may be integrally formed in shell 16b, as shown, it may alternatively be attached to shutter shell 16 as a separate component. Another possible embodiment has lip 45 projecting upward from lower cartridge shell 18b, into the bottom shutter shell 16b. In each noted embodiment, however, raised lip 45 provides rotational alignment of shutter 16.

FIGS. 7, 7A, and 7B illustrate the latch operation of shutter 16. As described in further detail below, two embodiments are contemplated for shutter latch mechanism 37. In the embodiment of FIG. 7A, latch 37 extends outwardly from cartridge 10, and operates by engaging a frame or stationary portion of drive 50. Alternatively, in the embodiment of FIG. 7B, latch 37 is recessed into cartridge 10 and unlatches by engaging a lever or similar mechanism within drive 50.

FIG. 7 is an exploded view of cartridge 10 illustrating latch mechanism 37. FIGS. 7A and 7B show detailed views of the portion of cartridge 10, including shutter latch 37. As shown, latch 37 comprises a main lever body 37f. An actuating point 37a, a pivot 37c, a spring 37d, and a tab 37e are coupled to the body of latch 37. Lower shutter shell 16b has a cut-out 37b that accommodates tab 37e. When shutter 16 is in the closed position, tab 37e engages cut-out 37b, thereby latching shutter 16 and preventing its rotation. When actuating point 37a is depressed, such as by inserting cartridge 10 into drive 50, lever 37f is forcibly pivoted about pivot 37c. The resulting pivotal movement of latch 37 causes tab 37e to move out of cut-out 37b, thereby releasing shutter 16 from latch 37. Spring 37d causes lever 37f to pivot in the reverse direction when the pressure is removed from actuating point 37a. Accordingly, when cut-out 37b is aligned with tab 37e, spring 37d biases tab 37e into cut-out 37b.

Referring in particular to FIG. 7A, shutter latch 37 is sized such that actuating point 37a extends outwardly from the edge of cartridge 10. Hence, when cartridge 10 is inserted into drive 50, latch 37 necessarily impinges upon the drive's frame and is thereby compressed, resulting in the pivoting of latch 37 and the release of shutter 16.

Figure 9A:
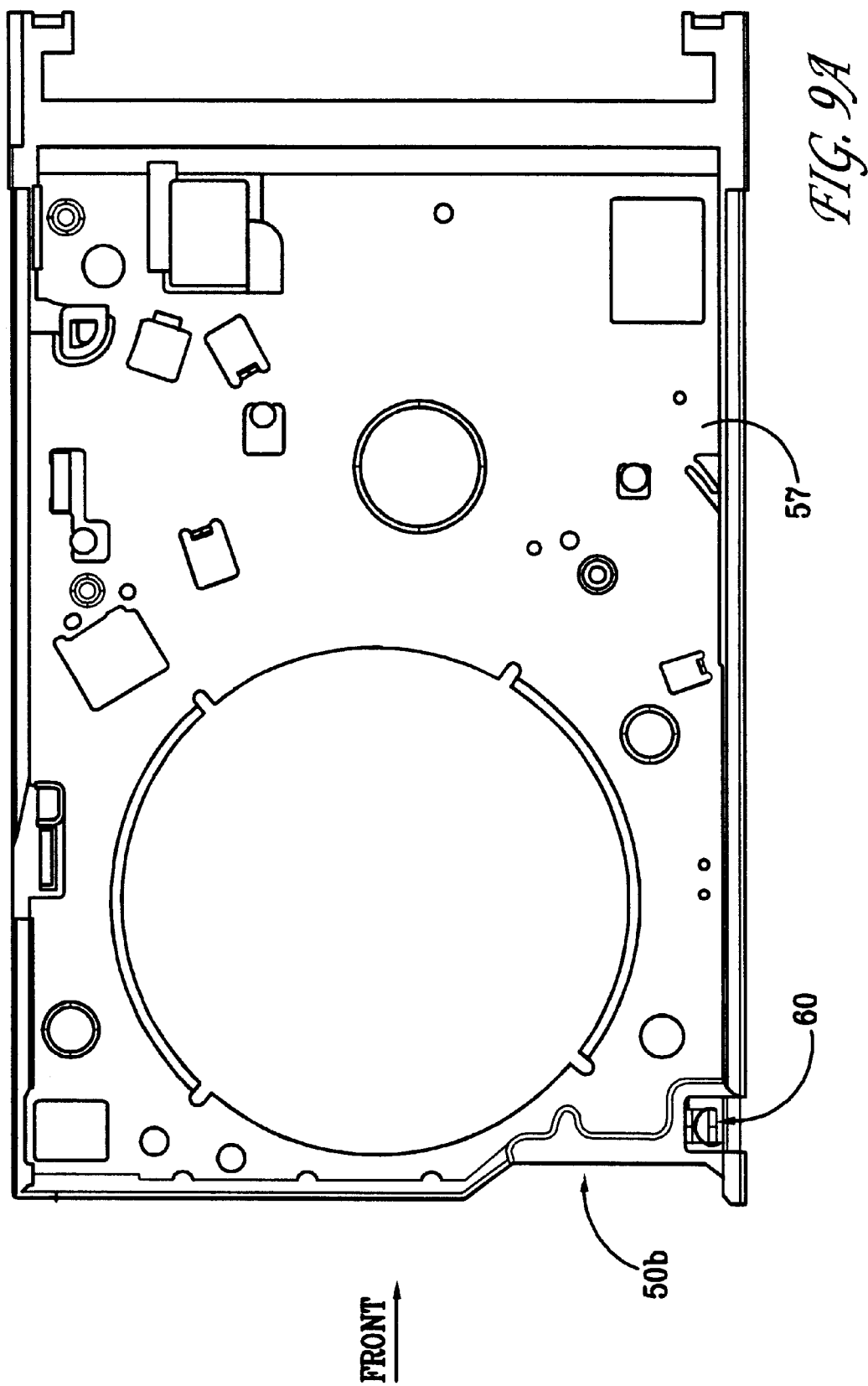
FIGS. 9A through 9C show the lever for unlatching the shutter of the cartridge of the present invention.
Figure 9B:
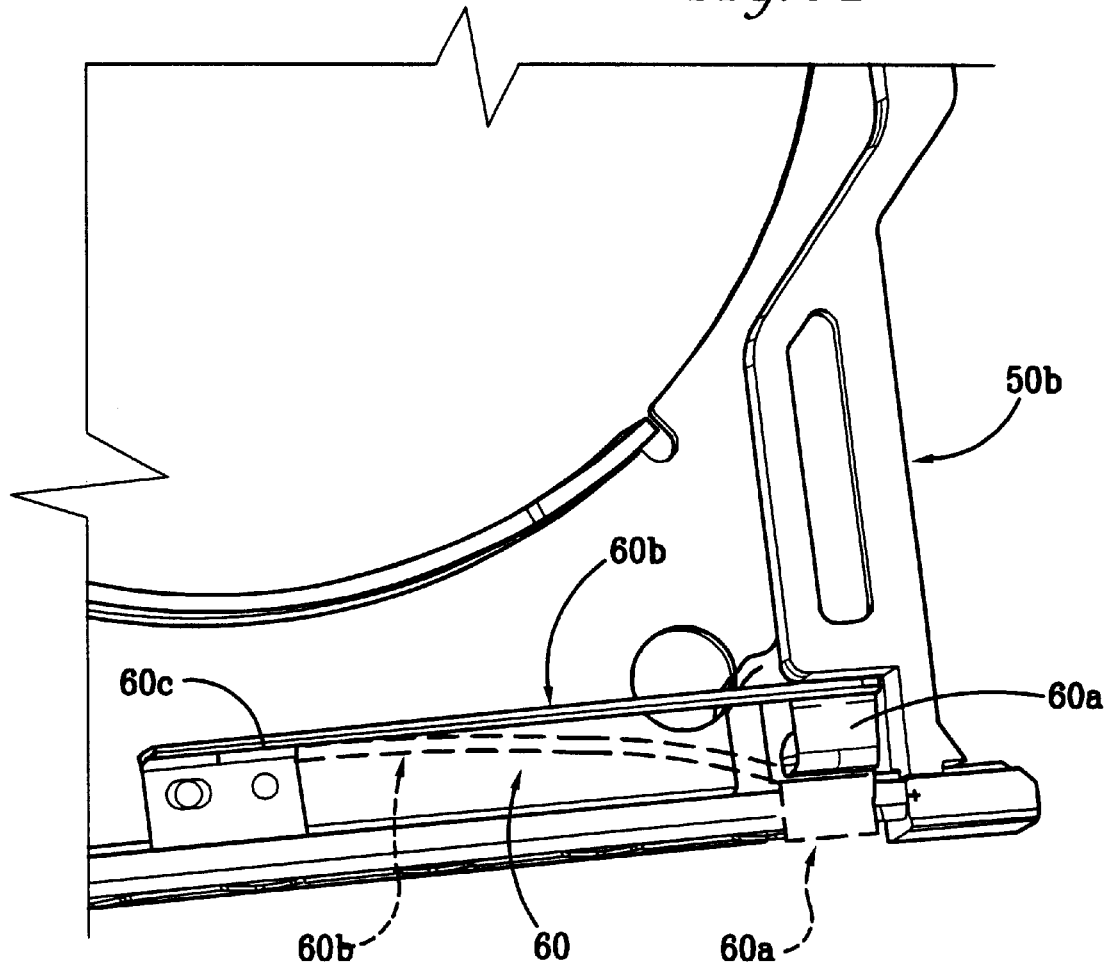
Figure 9C:
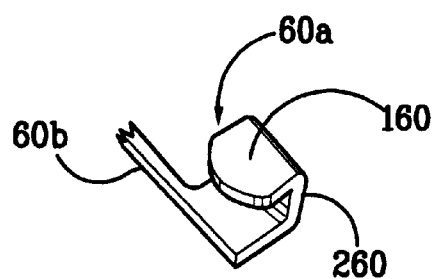

FIGS. 9A and 9B illustrate the mechanism in drive 50 adapted to engage and release shutter latch 37, preferably when the latch is recessed according to the embodiment of FIG. 7B. FIG. 9A is a top plan view of chassis 57 of drive 50 (for clarity, individual components are not shown). A releasing lever 60 is shown proximate a front corner of chassis 57. FIG. 9B is a bottom isometric view of the corner of chassis 57 within which releasing lever 60 is disposed. Lever 60 comprises a spring portion 60b, which is fixed to chassis 57 at block 60c, and an engagement portion 60a at the distal end of spring 60b. Engagement portion 60a comprises a release finger 160 that projects from an upstanding portion 260 of chassis 57. Release finger 160 comprises rounded corners.

Releasing lever 60 operates as cartridge 10 is inserted into drive 50. During insertion of cartridge 10, release finger 160 engages shutter latch 37, thereby permitting shutter 16 to rotate within cartridge 10. As cartridge 10 is urged further into drive 50, engagement portion 60a is urged outward (as indicated in phantom in FIG. 9B) as release finger 160 rides out of latch 37 and along the edge of cartridge 10. Simultaneously, spring portion 60b flexes to accommodate outward movement of engagement portion 60a. Additionally, the rounded corners of release finger 160 enable the finger to easily transition into and out of engagement with latch 37. When cartridge 10 is removed from drive 50, spring portion 60b returns to its initial condition, and is thus in a position to again engage cartridge 10 as the cartridge is inserted into drive 50.

As an alternative to the use of lever 60 to release latch 37, latch 37 may protrude from cartridge 10 and may be released by passive engagement with the frame of drive 50. FIGS. 10A through 10F further illustrate the operation of this alternative latch embodiment. In general, as cartridge 10 is inserted into drive 50, latch-actuating point 37a impinges on side rails 51 of drive 50. The impingement causes the tab of latch 37 to release from shutter 16, thereby freeing the shutter to rotate. Somewhat simultaneously, projection 17 impinges on the opening of drive 50 proximate the stepped portion 50b. As cartridge 10 is urged further into drive 50, projection 17 moves along projection track 35 of the cartridge and along the face of step 50b of drive 50. Accordingly, shutter 16 is opened to allow access to disk 14 of cartridge 10.

FIGS. 10A and 10B are top and bottom plan views of cartridge 10 and drive 50, with the cartridge shown partially inserted into the drive. Top shell 18a has been removed to further illustrate the operation of latch 37. Furthermore, in FIGS. 10A and 10B, cartridge 10 is inserted into drive 50 just to the point that actuating point 37a is proximate the front of drive 50. As cartridge 10 is inserted further into drive 50, actuating point 37a engages side rail 51 of drive 50, thereby unlatching shutter shell 16 and allowing it to rotate freely. Front frame 50a of drive 50 has a stepped portion 50b so that, at this point, projection 17 has not yet engaged the front frame.

Figure 10C:
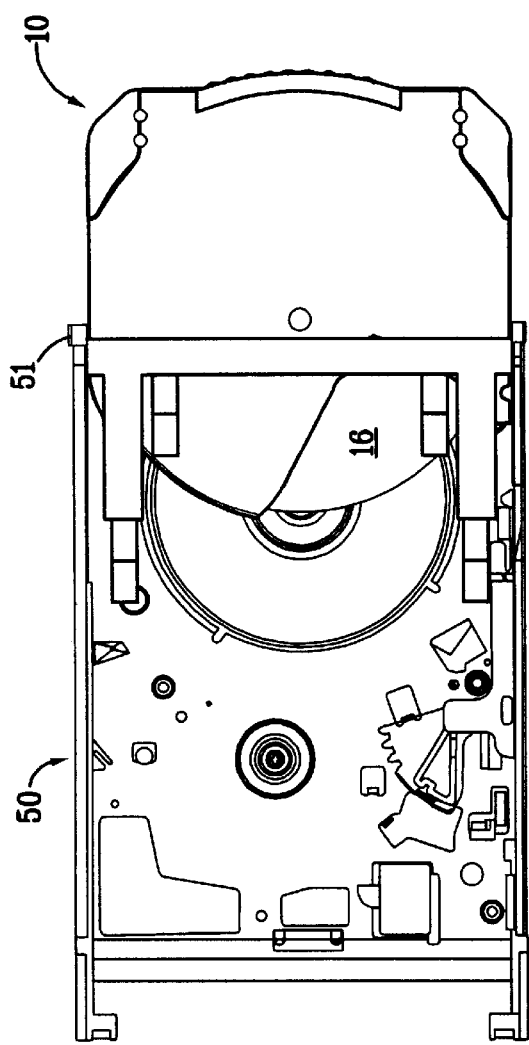
Figure 10D:
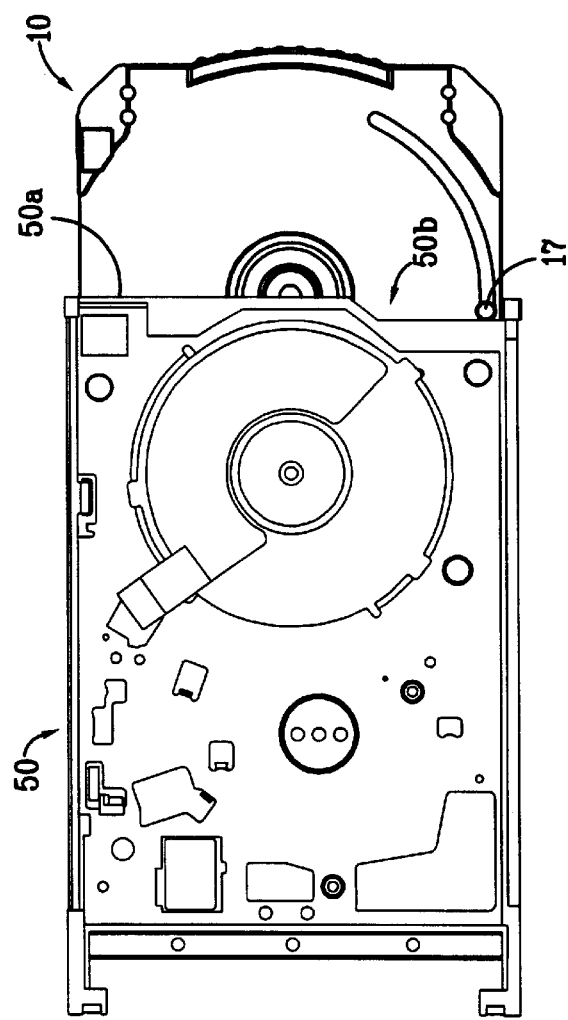

FIGS. 10C and 10D are top and bottom plan views that further illustrate the operation of shutter 16 in a more fully inserted position. In these figures, projection 17 has engaged front frame 50a proximate stepped portion 50b. As cartridge 10 is urged further into drive 50, frame front 50a urges projection 17 to rotate shutter 16 toward the open position.

Consequently, projection 17 slides across stepped portion 50*b* as cartridge 10 further enters drive 50.

Figure 10E:
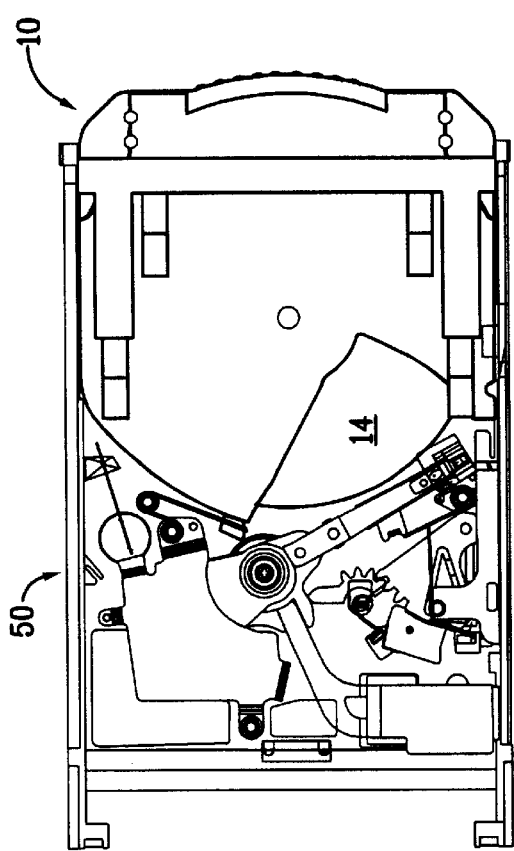
Figure 10F:
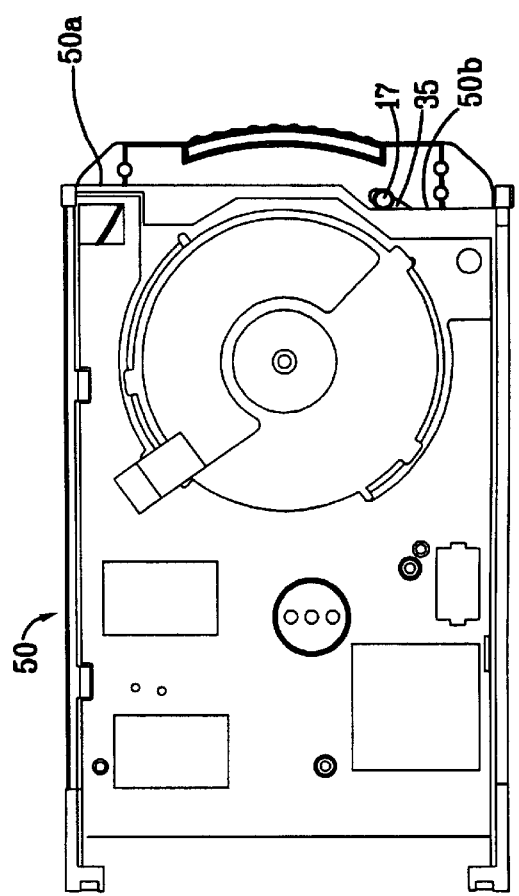

Finally, as illustrated in the top and bottom plan views shown in FIGS. 10E and 10F, as cartridge 10 is urged fully into drive 50, projection 17 has moved rearwardly in projection track 35 and across the stepped portion 50*b* of front frame 50*a*. Consequently, shutter 16 is rotated to the open position, thus providing access to disk 14 by read/write head 54.

The operation of shutter 16 during cartridge ejection is essentially the reverse sequence from that described above in connection with FIGS. 10A through 10F. However, the ejection of cartridge 10 from drive 50 is aided by spring 21 of cartridge 10. In particular, as cartridge 10 is ejected from drive 50, the force of spring 21 rotates shutter 16 in the clockwise direction. The force of spring 21 causes projection 17 to impinge upon front frame 50*a*. This force also causes cartridge 10 to move outwardly from drive 50. The force required to move cartridge 10 diminishes as the cartridge moves outwardly from drive 50. When the cartridge moves proximately out of drive 50, shutter 16 is rotated to the closed position. At this point, latch 37 latches shutter 16 to the closed position as actuating point 37*a* clears drive rails 51.

The above description of preferred embodiments is not intended to impliedly limit the scope of protection of the following claims. Thus, for example, except where they are expressly so limited, the claims are not limited to applications involving cartridges for disk-drive systems.

What is claimed is:

1. A disk cartridge for use in a removable-media disk drive, said cartridge comprising:
   a data-storage medium;
   an outer shell enclosing said data-storage medium and having a driving-access opening and a head-access opening;
   an inner shell movably disposed within said outer shell, said inner shell moving between an open position wherein said data-storage medium is accessible by way of said head-access opening, and a closed position wherein said data-storage medium is inaccessible by way of said head-access opening; and
   a liner disposed between said outer shell and said inner shell, wherein said data-storage medium is engageable with said liner.

2. The disk cartridge of claim 1, wherein said liner is fixedly attached to said outer shell.

3. The disk cartridge of claim 1, wherein said liner is fixedly attached to said inner shell.

4. The disk cartridge of claim 1, wherein said liner comprises polyester.

5. The disk cartridge of claim 1, wherein said liner has a thickness of between about 1.5 and 3.5 mils.

6. The disk cartridge of claim 1, wherein said liner has a thickness of about 2.5 mils.

7. The disk cartridge of claim 1, wherein said data-storage medium comprises a magnetic medium for storing digital data.

8. A memory-storage device, comprising:
   a data-storage medium;
   an outer shell having top and bottom planar surface, said data-storage medium being rotatably disposed within said outer shell, said outer shell further comprising an opening defined in at least one of said top and bottom planar surfaces;
   a rotatable member disposed within said outer shell for rotation between first and second position, said rotatable member enclosing at least a portion of a radially outermost peripheral surface of said data-storage medium; and
   a liner disposed between said outer shell and said rotatable member, wherein said data-storage medium is engageable with said liner.

9. The memory-storage device of claim 8, wherein said rotatable member comprises an inner shell.

10. The memory-storage device of claim 8, wherein said liner is fixedly attached to said outer shell.

11. The memory-storage device of claim 8, wherein said liner is fixedly attached to said rotatable member.

12. The memory-storage device of claim 8, wherein said liner comprises polyester.

13. The memory-storage device of claim 8, wherein said liner has a thickness of between about 1.5 and 3.5 mils.

14. The memory-storage device of claim 8, wherein said liner has a thickness of about 2.5 mils.

15. The memory-storage device of claim 8, wherein said data-storage medium comprises a magnetic medium for storing digital data.

16. a disk cartridge comprising:
   a flexible data-storage medium;
   an outer shell having a medium-access opening wherein said medium-access opening comprises a disk-access opening;
   a rotary shutter shell disposed within said outer shell, said rotary shutter shell moving between a first position wherein said medium-access opening of said outer shell is covered by said rotary shutter shell, and a second position wherein said data-storage medium is exposed in said medium-access opening of said outer shell; and
   a liner disposed between said outer shell and said shutter shell, wherein said data-storage medium is engageable with said liner.

17. The disk cartridge of claim 16, wherein said medium-access opening of said outer shell is formed in said outer shell proximate a front edge of said outer shell, and said medium-access opening of said outer shell spans an arc within a range of about 60 and 90 degrees.

18. The disk cartridge of claim 16, wherein said outer shell comprises an upper cartridge shell portion and a lower cartridge shell portion, and said shutter shell comprises an upper shutter shell portion and a lower shutter shell portion.

19. The disk cartridge of claim 18, wherein said liner comprises a sheet material fixedly attached to at least one of said upper and lower shutter shell portions.

20. The disk cartridge of claim 18, wherein said liner comprises a sheet material fixedly attached to at least one of said upper and lower cartridge shell portions.

21. The disk cartridge of claim 16, wherein said liner has a thickness of between about 1.5 and 3.5 mils.

22. The disk cartridge of claim 16, wherein said liner has a thickness of about 2.5 mils.

23. The disk cartridge of claim 16, wherein said liner comprises polyester.

24. The disk cartridge of claim 16, wherein said shutter shell is substantially circular in shape.

25. The disk cartridge of claim 24, wherein said shutter shell is rotatably coupled to said outer shell.

26. The disk cartridge of claim 24, wherein said liner is annularly disposed along a circumference of said shutter shell.

27. The disk cartridge of claim 24, wherein a width of said liner is less than about one-third of a radius of said shutter shell.

28. The disk cartridge of claim 24, wherein a width of said liner is between about one-fourth and one-third of a radius of said shutter shell.

29. The disk cartridge of claim 27 or 28, wherein said liner is radially disposed along an outer circumference of said shutter shell.

30. The disk cartridge as recited in claim 16, wherein said shutter shell forms an arcuate front edge of said cartridge when said shutter shell is in said first position.

31. The disk cartridge as recited in claim 30, wherein said arcuate front edge of said cartridge forms an edge from about a midpoint of a front of said cartridge.

* * * * *